(12) United States Patent
Sa et al.

(10) Patent No.: US 6,717,802 B2
(45) Date of Patent: Apr. 6, 2004

(54) COMPUTER COMMUNICATION PORT ASSEMBLY

(75) Inventors: Wei-Shi Sa, Shinjuang (TW); Tien-Wei Lin, Taipei (TW)

(73) Assignee: Asustek Computer Inc., Taipei (TW)

( * ) Notice: Subject to any disclaimer, the term of this patent is extended or adjusted under 35 U.S.C. 154(b) by 0 days.

(21) Appl. No.: 09/871,680

(22) Filed: Jun. 4, 2001

(65) Prior Publication Data

US 2002/0012227 A1 Jan. 31, 2002

(30) Foreign Application Priority Data

Jun. 5, 2000 (TW) ........................................ 89110951 A

(51) Int. Cl.⁷ .............................. G06F 1/16; H05K 7/10
(52) U.S. Cl. ........................ 361/683; 361/685; 361/686; 361/727; 439/928.1
(58) Field of Search ................................ 361/679–686, 361/724, 725, 727; 439/55, 928.1

(56) References Cited

U.S. PATENT DOCUMENTS

| 4,941,841 | A | * | 7/1990 | Darden et al. ............... 361/685 |
| 5,507,650 | A | * | 4/1996 | Larabell ....................... 439/61 |
| 5,784,644 | A | * | 7/1998 | Larabell ......................... 710/9 |
| 5,870,027 | A | * | 2/1999 | Ho ............................. 340/525 |
| 6,067,226 | A | * | 5/2000 | Barker et al. ............... 361/683 |
| 6,108,198 | A | * | 8/2000 | Lin ........................... 312/223.1 |
| 6,219,229 | B1 | * | 4/2001 | Lee ............................ 361/682 |

* cited by examiner

Primary Examiner—Jayprakash H. Gandhi
(74) Attorney, Agent, or Firm—Rabin & Berdo, P.C.

(57) ABSTRACT

A communication port device is mounted in a slot on the front side of computer for easily plugging/unplugging a peripheral device to the communication port device. The present device is in electrical connection with motherboard and includes various communication ports for selection. Thus, it is adaptable for user customization. Its assembly/disassembly of connection to peripherals is more convenient. Also, there is no need to alter the design of housing, motherboard, etc.

13 Claims, 6 Drawing Sheets

COMPUTER COMMUNICATION PORT ASSEMBLY

CROSS-REFERENCE TO RELATED APPLICATION

This application claims the priority benefit of Taiwan application serial no. 89110951, filed on Jun. 5, 2000.

BACKGROUND OF THE INVENTION

1. Field of Invention

The present invention relates to personal computers and more particularly to a device incorporating a plurality of computer communication ports adapted for applications.

2. Description of Related Art

A conventional computer 100 is shown in FIGS. 1a and 1b. On the front side of the housing 10 of computer 100, there are provided a plurality of slots 1, 2, 3 and 4 for 5.25" CD-ROM, 3.5" floppy disk drive and others, a plurality of indication lamps 5 for indicating power, hard disk drive and others, and a plurality of buttons 6 for activating power and others. As shown in FIG. 1b, on the rear side of computer 100 there are provided a power socket 7, a communication port assembly 8, and an adapter port assembly 9. Communication port assembly 8 includes a variety of communication ports such as parallel port 81, universal serial bus (USB) port 82, a phone jack, a line-in, a line-out and a micro-in (indicated by numeral 83 as a whole), a keyboard port 84, and a mouse port 85. Adapter port assembly 9 includes serial ports 91 and 92. Furthermore, there is another adapter VGA port (not shown) for connecting to a monitor.

However this is inconvenient for a user to connect a peripheral device to computer 100 because communication port assembly 8 is located on the rear. For example, the user has to plug a digital camera or digital camcorder to the communication port assembly 8 when such need arises. Also, it is usually for user to unplug the digital camera or digital camcorder when the job is done. In view of the above, it will contradict the trend and convenience of plug-and-play function.

Another conventional computer 200 shown in FIG. 2 is proposed to overcome the drawback of the conventional computer 100 shown in FIGS. 1a and 1b. On the front side of housing 20 of computer 200, there are provided slots 21 and 22, indication lamps 23, buttons 24, serial port 25, USB port 26 and etc. This may facilitate plugging a peripheral device into the front side of computer 200. However, such a design is still unsatisfactory because some people may feel that the number of communication ports is not sufficient, while some may view such implementation as being redundant. Further, the front surface of housing 20 may be too crowded due to the additional provision of communication ports. Furthermore, the number and types of communication ports are predetermined while manufacturing the housing, resulting in less adaptability. This is disadvantageous for user selection, future expansion, and compatibility etc. Thus, improvements still exist.

SUMMARY OF THE INVENTION

It is an object of the present invention to provide a communication port box removably mounted in a slot on the front side of a computer, including a front panel of circuit board having a variety of communication ports; a plurality of rear cables such as flat ribbon cable being electrically connected between the communication ports and a plurality of connectors on the motherboard; and an engagement section mounted with the front panel removably engaged to the slot of a computer housing. By utilizing this, the plugging/unplugging of a peripheral device to the communication port device is made easy. Further, it is adaptable for user customization without altering the design of the computer housing.

It is another object of the present invention to provide a computer system including a housing, a motherboard and a communication port device which is removably mounted in one of the slots formed on the front side of the housing. The motherboard is furnished inside the housing, which includes a plurality of first communication ports located on the rear side of the housing, and a plurality of connectors. The communication port device includes a variety of second communication ports on a front panel thereof, a plurality of rear cables being electrically connected between the second communication ports and the connectors on the motherboard.

In one aspect of the present invention, the communication port can be a serial port, a USB port, an audio input port, an audio output port, a video input port, a video output port, or an IEEE 1394 port.

In another aspect, there is an indicator such as an LED or a seven-segment indicator on the front panel for showing the information of the computer system. A plurality of buttons are also included on the front panel to select or switch different detecting functions such as detections of CPU frequency, temperature or voltage, rotation speed of a fan, system diagnosis and etc.

BRIEF DESCRIPTION OF THE DRAWINGS

The present invention will become fully understood from the detailed description given hereinbelow illustration only, and thus are not limitative of the present invention, and wherein.

DETAILED DESCRIPTION OF THE INVENTION

Figure 1B:
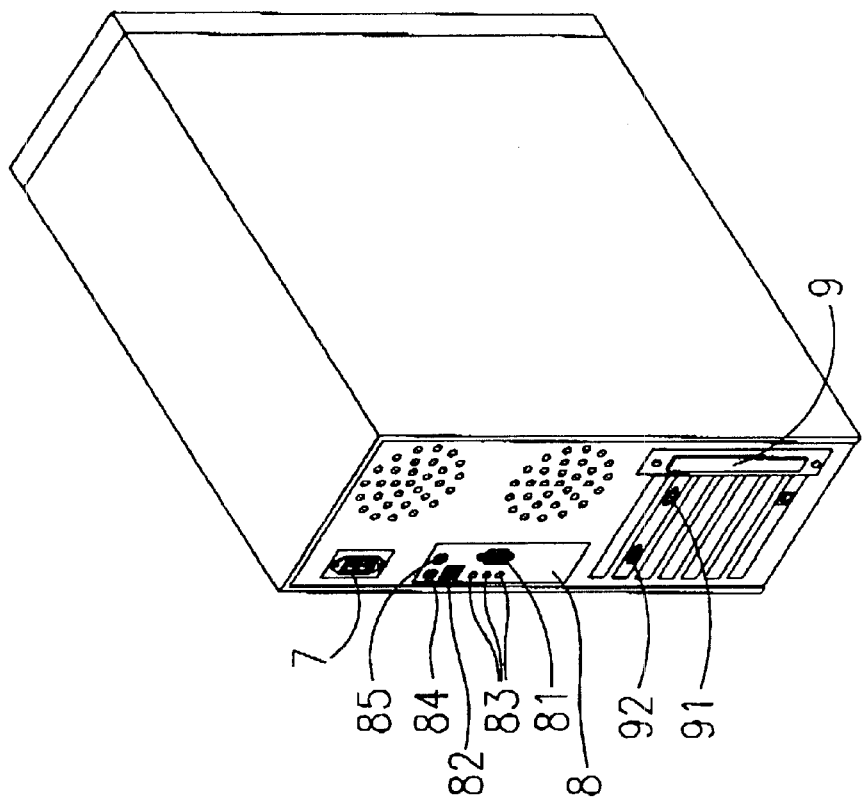
FIGS. 1a and 1b are perspective views showing the front and rear sides of a conventional computer respectively.
Figure 1A:
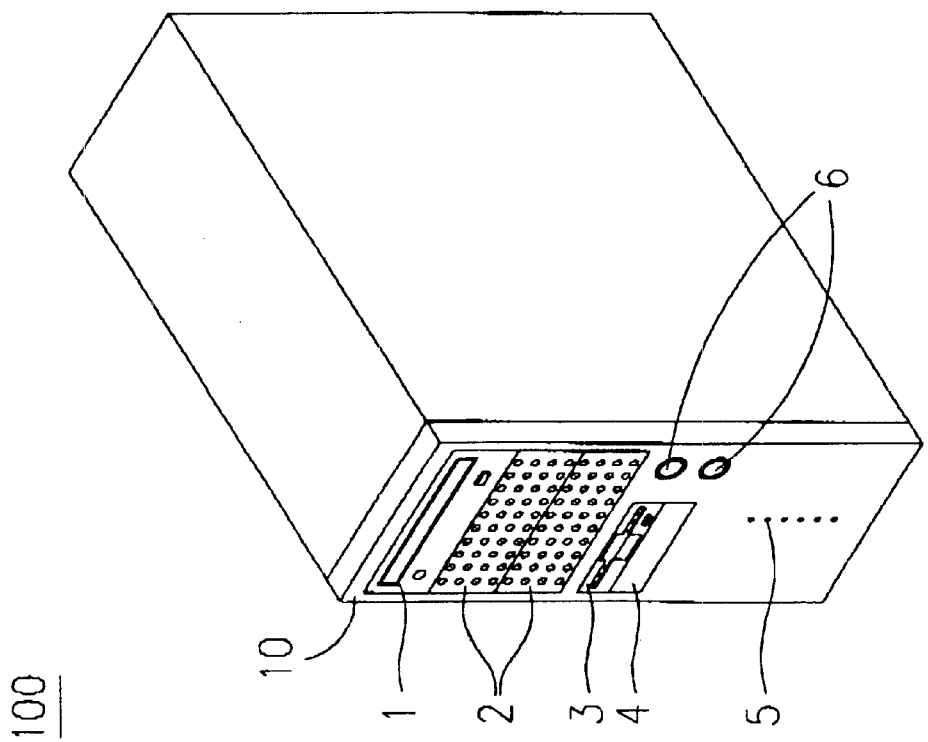
Figure 2:
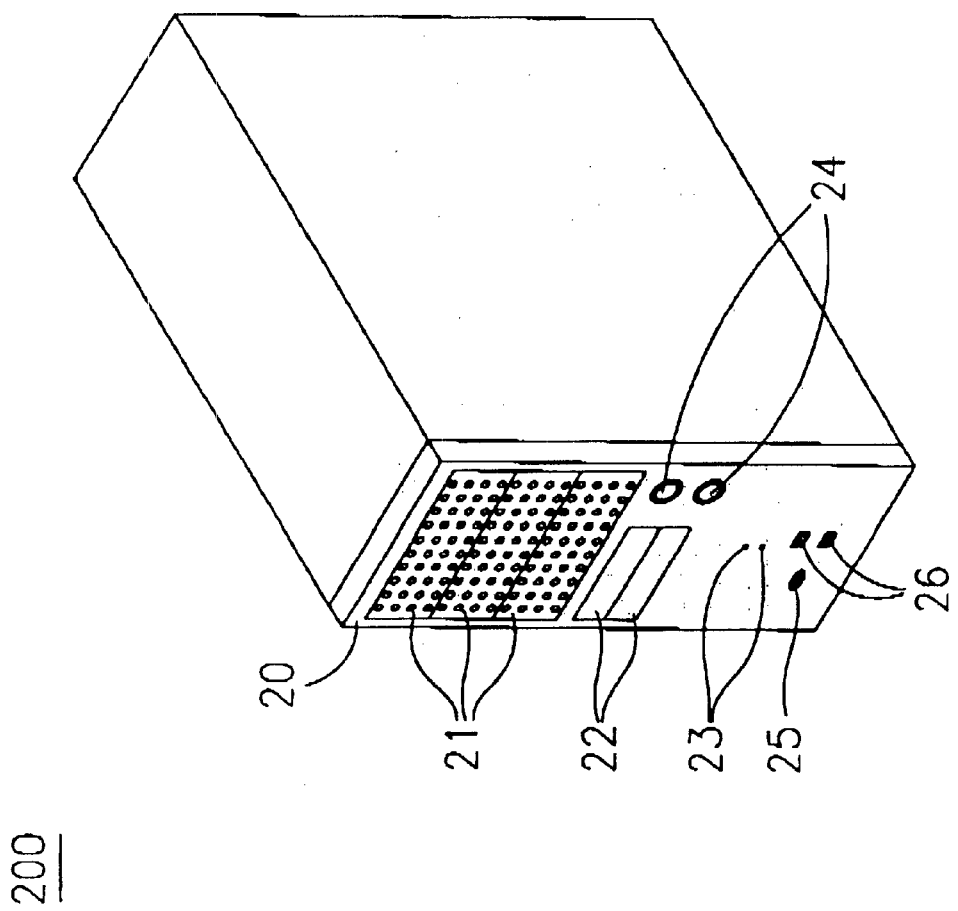
FIG. 2 is a perspective view showing the front side of another conventional computer.
Figure 3:
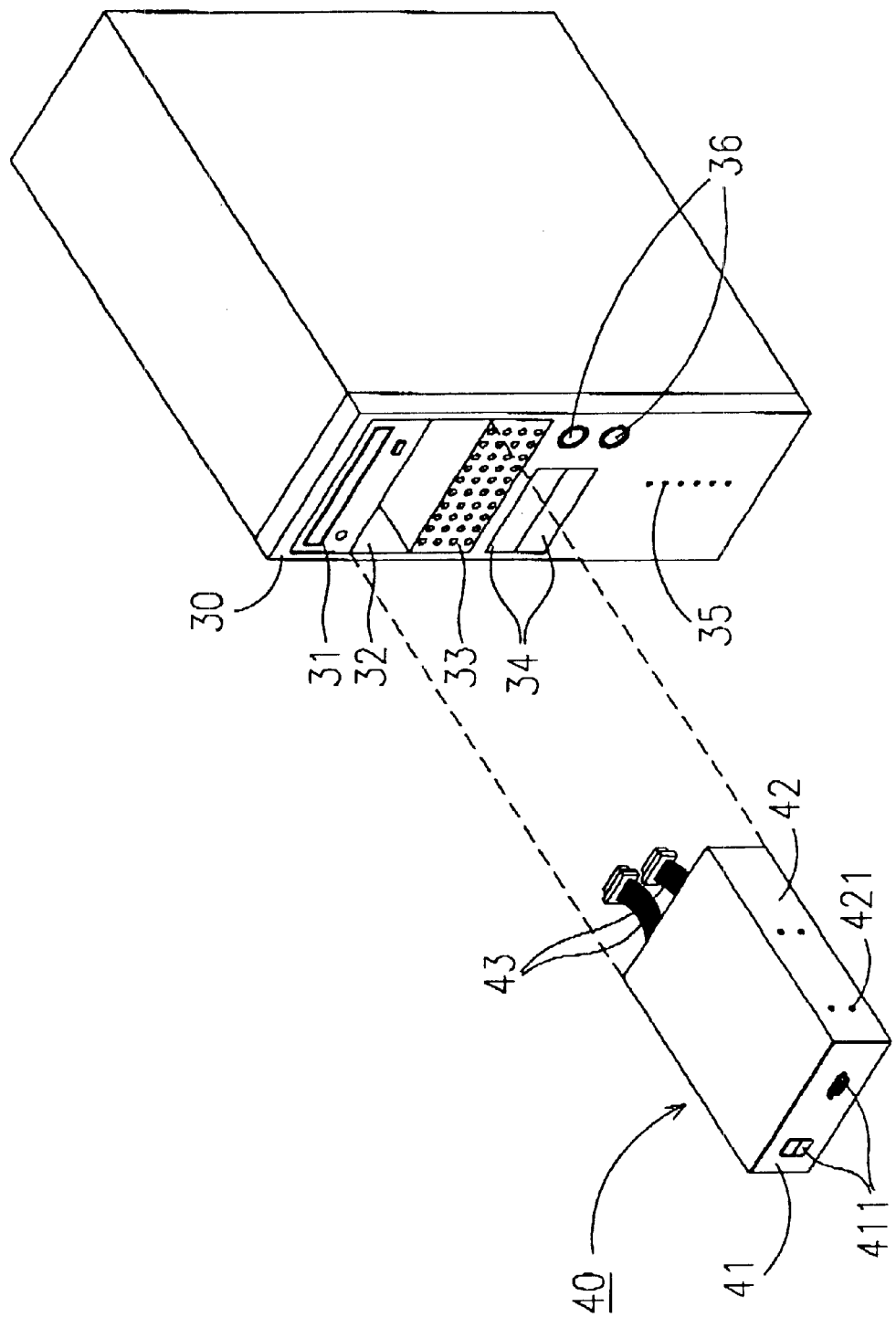
FIG. 3 is a perspective view of a first preferred embodiment of communication port assembly removably mounted on a computer according to the invention.
Figure 4:
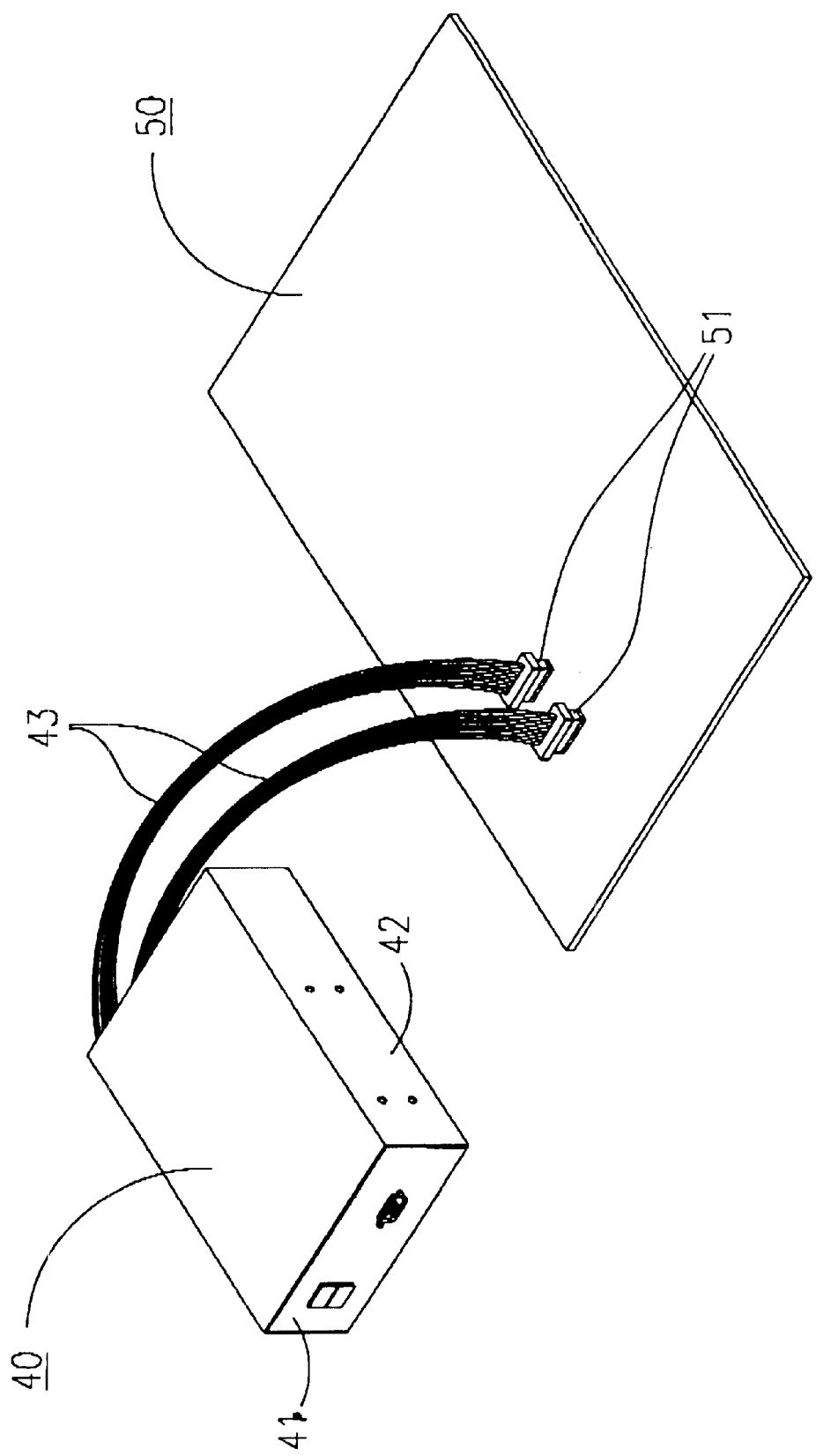
FIG. 4 is a perspective view schematically illustrating the connection of communication port assembly in FIG. 3 to a motherboard.

Referring to FIGS. 3 and 4, a first preferred embodiment of communication port assembly according to the invention is shown. The communication port assembly is implemented as a box containing the functional elements of a communication port device 40. Communication port device 40 has a rectangular body and is fittedly mounted in a slot 32 on the housing 30 of computer 300. On the front side of the housing 30, there are provided three slots 31, 32, and 33 for a 5.25" CD-ROM and others, two smaller slots 34 for a 3.5" floppy disk drive, hard disks and the others, a plurality of indication lamps 35 for indicating power, hard disk drive and others, and two buttons 36. Communication port device 40 includes a front panel section 41, an engagement section 42, and a plurality of rear cables 43 such as flat ribbon cables. In the embodiment, communication port device 40 has a cross section conformed to the 5.25" slot 32, while it is appreciated that communication port device 40 may have a cross section conformed to a 3.5" slot in other embodiments. Panel section 41 with a circuit board (not shown) mounted therebehind in the engagement section 42 includes a plurality of communication ports 411 protruded outside the panel section 41. In the embodiment, the number and types of communication ports 411 are corresponding to that on the motherboard. For example, communication ports may consist of only a serial port. Engagement section 42 has a plurality of threaded holes 421 on the opposite sides so that engagement section 42 may be threadedly secured to a rack (not shown) in the slot 32 of the computer 300. It is appreciated that engagement section 42 may be secured to computer 300 by means of a latch mechanism in the other embodiment. Each of cables 43 has one end coupled to a corresponding communication port 411 and the other end coupled to one of the corresponding connectors 51 on motherboard 50 (shown as in FIG. 4). This connection can effect a signal communication between motherboard 50 and communication ports 411 which are in turn connected to peripheral devices. In view of above, the first embodiment of the invention allows user to select whether it is necessary to install the communication port device 40 in a quick, easy way. Also, there is no need to alter the design of the housing, even the motherboard itself, etc. Hence, it is highly industrially applicable.

Figure 5:
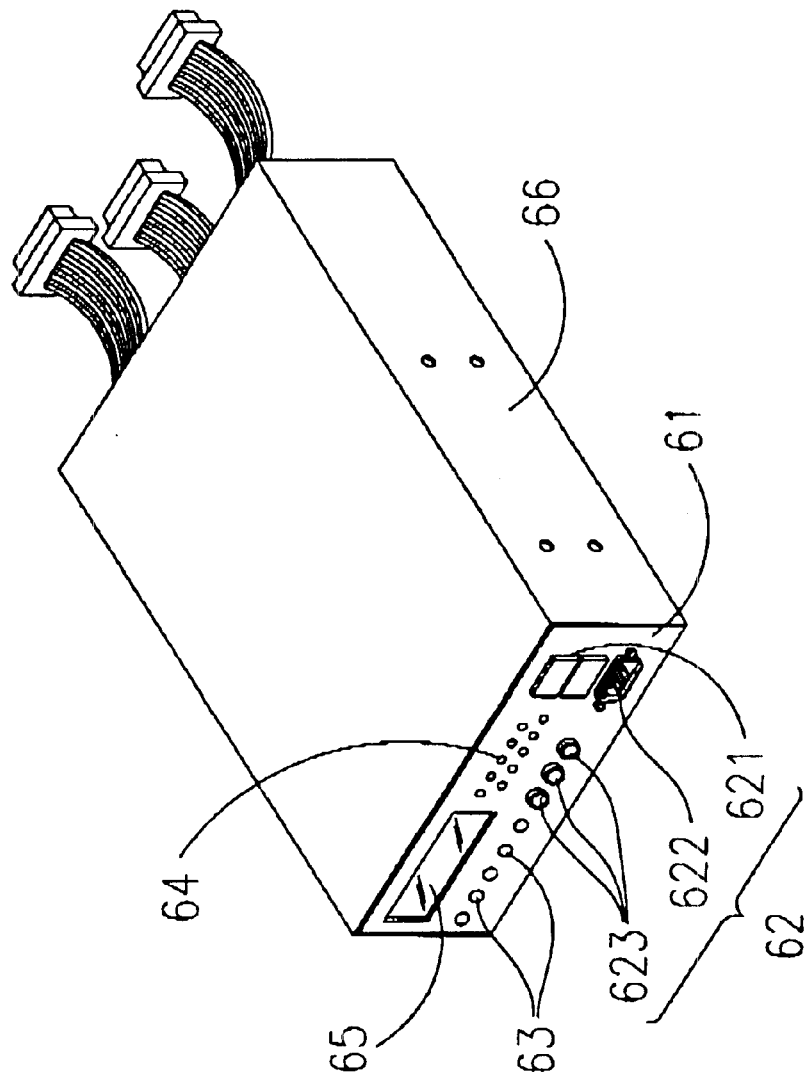
FIG. 5 is a perspective view of a second preferred embodiment of communication port assembly according to the invention.
Figure 6:
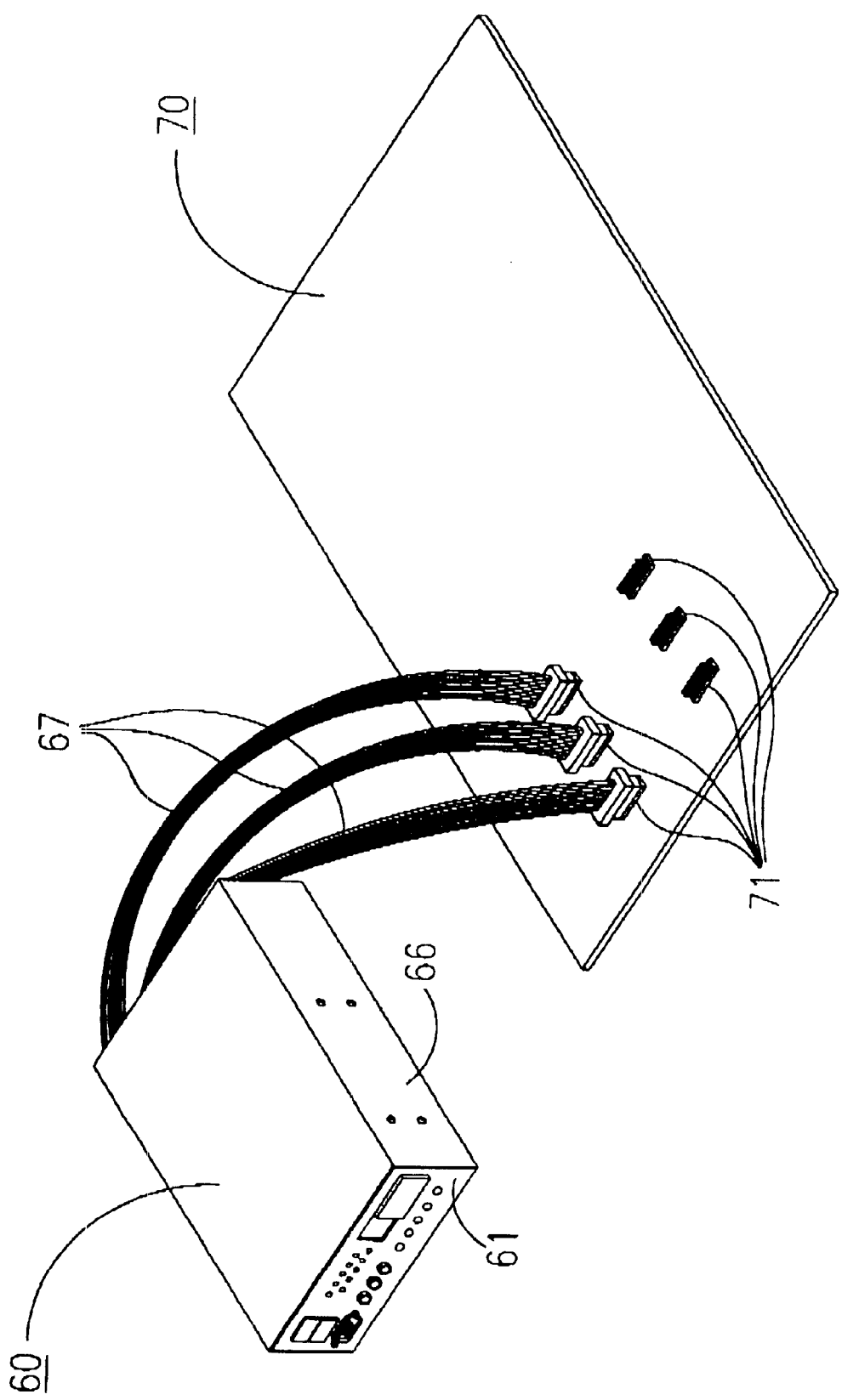
FIG. 6 is a perspective view schematically illustrating the connection of communication port device to a motherboard.

Referring to FIGS. 5 and 6, other preferred embodiments of the communication port assembly according to the invention are shown. Communication port assembly is implemented as a communication port device 60 and a motherboard 70 (shown as in FIG. 6). The differences between these and the first embodiments are detailed below. Communication port device 60 also includes a front panel section 61, an engagement section 66, and a plurality of rear cables 67. Motherboard 70 includes a plurality of various connectors 71, greater in number than that shown for the first embodiment. Accordingly, there are more corresponding communication ports 62 provided on the panel section 61. For example, numeral 621 is a serial port, numeral 622 are USB ports, and numeral 623 indicates line-in, line-out and micro-in. The types of the communication ports 62 may further include an audio input port, an audio output port, a video input port IEEE 1394 communication port and/or an SPDIF communication port. Furthermore, on the panel section 61, there are provided a plurality of buttons 63 operable to obtain information such as CPU temperature, rotation speed of fan, voltage, frequency, system diagnosis, etc., a display 65 such as a LCD or a seven-segment indicator for showing CPU status, and a plurality of indication lamps 64 such as an LED for indicating the item shown on display 65. Also, at least one of the buttons 63 may be configured as a hot key for specific functions as long as there is a corresponding control chip mounted on the motherboard. Additionally, a cover may be mounted on panel section 61 for protection of second communication ports 62.

The communication port device in each of above embodiments is shaped like a CD-ROM, thus forming an enclosed space for accommodating electrical devices and associated circuitry. This design is neat. In another design, the communication port device may be implemented as a panel like device for greatly reducing the occupied space.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A communication port device for a computer system, the computer system including a housing and a circuit board mounted inside the housing, a front side of the housing having a plurality of slots for receiving expansion devices, the circuit board having a connector formed thereon, the communication port device comprising:
   a port-supporting member for removable insertion into the housing through one of the slots such that a front surface thereof is exposed on the front side of the housing;
   a plurality of communication ports formed in the front surface of the port-supporting member, wherein the communication ports comprise a serial port, a universal serial bus (USB) port, and line-in, line-out and micro-in ports; and
   connecting means for electrically connecting the communication ports to the circuit board through the connector.

2. The communication port device of claim 1, wherein the connecting means comprises a plurality of rear cables.

3. The communication port device of claim 1, further comprising an engagement section fixed to the port-supporting member for engaging with the housing.

4. The communication port device of claim 1, wherein the circuit board is a motherboard.

5. A computer system, comprising:
   a housing including a plurality of slots formed at a front side thereof;
   a motherboard furnished inside the housing including
      a plurality of connectors, and
      a plurality of first communication ports located at a rear side of the housing; and
   a communication port device including
      a port-supporting member removably inserted into the housing though one of the slots such that a front surface thereof to be exposed on the front side of the housing,
      a plurality of second communication ports formed in the front surface of the port-supporting member, wherein the second communication ports comprise a serial port, a universal serial bus (USB) port, and line-in, line-out and micro-in ports, and
      connecting means connected to the connectors for electrically connecting the second communication ports to the motherboard.

6. The computer system of claim 5, wherein the connecting means comprises a plurality of rear cables electrically connecting the second communication ports and the connectors, respectively.

7. The computer system of claim 5, wherein the communication port device further comprises an engagement element fixed to the port-supporting member for engaging with the housing.

8. A computer system, comprising:
   a housing including a plurality of slots formed at a front side thereof;
   a motherboard furnished inside the housing including
      a plurality of connectors, and
      a plurality of first digital data communication ports located at a rear side of the housing; and
   a communication port device including a port-supporting member removably inserted into the housing through one of the slots such that a front surface thereof to be exposed on the front side of the housing, a plurality of second digital data communication ports formed in the front surface of the port-supporting member, wherein the second digital data communication ports consists of at least one serial port, at least one universal serial bus (USB) port, and line-in, line-out and micro-in ports; and connecting means connected to the connectors for electrically connecting the second digital data communication ports to the motherboard.

9. The computer system of claim 8, wherein the connecting means comprises a plurality of rear cables electrically connecting the second digital data communication ports and the connectors, respectively.

10. The computer system of claim 8, wherein the communication port device further comprises an engagement element fixed to the port-supporting member for engaging with the housing.

11. A computer system, comprising:

a housing including a plurality of slots formed at a front side thereof;

a motherboard furnished inside the housing including a plurality of connectors, and a plurality of digital data communication ports located at a rear side of the housing; and a communication port device including a port-supporting member removably inserted into the housing through one of the slots such that a front surface thereof to be exposed on the front side of the housing, a digital data communication port group formed in the front surface of the port-supporting member, said group having at least one serial port, at least one universal serial bus (USB) port, and line-in, line-out and micro-in ports; and connecting means connected to the connectors for electrically connecting the digital data communication port group to the motherboard.

12. The computer system of claim 11, wherein the connecting means comprises a plurality of rear cables electrically connecting the ports of the digital data communication port group and the connectors, respectively.

13. A computer system of claim 11, wherein the communication port device further comprises an engagement element fixed to the port-supporting member for engaging the housing.

* * * * *